US011055691B2

(12) United States Patent
Deprun et al.

(10) Patent No.: US 11,055,691 B2
(45) Date of Patent: Jul. 6, 2021

(54) DISPLAY ON A SMARTPHONE SCREEN OF A POSITIONING PATTERN OF A CONTACTLESS CARD TO IMPROVE NEAR FIELD COMMUNICATION

(71) Applicant: IDEMIA France, Courbevoie (FR)

(72) Inventors: Jean-François Deprun, Courbevoie (FR); Yann-Loic Aubin, Courbevoie (FR)

(73) Assignee: IDEMIA FRANCE, Courbevoie (FR)

( * ) Notice: Subject to any disclaimer, the term of this patent is extended or adjusted under 35 U.S.C. 154(b) by 0 days.

(21) Appl. No.: 16/846,874

(22) Filed: Apr. 13, 2020

(65) Prior Publication Data
US 2020/0327533 A1      Oct. 15, 2020

(30) Foreign Application Priority Data

Apr. 15, 2019   (FR) ...................................... 1903987

(51) Int. Cl.
| | | |
|---|---|---|
| *G06Q 20/32* | (2012.01) | |
| *G06Q 20/34* | (2012.01) | |
| *G07F 7/08* | (2006.01) | |
| *H04B 5/00* | (2006.01) | |

(52) U.S. Cl.
CPC ..... *G06Q 20/3274* (2013.01); *G06Q 20/3276* (2013.01); *G06Q 20/3278* (2013.01); *G06Q 20/352* (2013.01); *G07F 7/0893* (2013.01); *H04B 5/0031* (2013.01)

(58) Field of Classification Search
CPC ........ G06K 19/00; G06Q 20/20; G06Q 20/34; G06Q 20/341

USPC ................................ 235/380, 375, 487, 488
See application file for complete search history.

(56) References Cited

U.S. PATENT DOCUMENTS

| | | | |
|---|---|---|---|
| 10,498,401 B1* | 12/2019 | Rule ...................... H04N 5/232 |
| 10,853,795 B1* | 12/2020 | Capurso ............. G06Q 20/4014 |
| 2013/0143604 A1 | 6/2013 | Kashimoto | |
| 2015/0294304 A1* | 10/2015 | Donnellan ......... G06Q 20/3276 705/44 |

(Continued)

FOREIGN PATENT DOCUMENTS

| | | |
|---|---|---|
| FR | 3 061 333 | 6/2018 |
| WO | WO 2014/116235 | 7/2014 |

OTHER PUBLICATIONS

French Search Report, FR 1903987, dated Dec. 5, 2019.

*Primary Examiner* — Edwyn Labaze
(74) *Attorney, Agent, or Firm* — Nixon & Vanderhye

(57) ABSTRACT

To ensure the quality of NFC communication between a contactless card and a smartphone, a positioning pattern, for example a portion of the card visual, is displayed on the screen of the smartphone. This is a visual aid to help the user to position the contactless card, in proximity to the smartphone, toward a position where a card indicator for which provision is made on the card, typically the portion complementary to the card visual, is aligned with the displayed pattern. The positioning is made easy as the positioning pattern and the card indicator are preferably chosen to be visually complementary. Also, the contactless card is in the appropriate position when the card indicator visually complements the positioning pattern. The positioning pattern is thus displayed at a location of the screen allowing the best NFC coupling between the card and the smartphone.

20 Claims, 12 Drawing Sheets

(56) References Cited

U.S. PATENT DOCUMENTS

2018/0129831 A1\* 5/2018 Yokoi ............... H01L 29/78696

\* cited by examiner

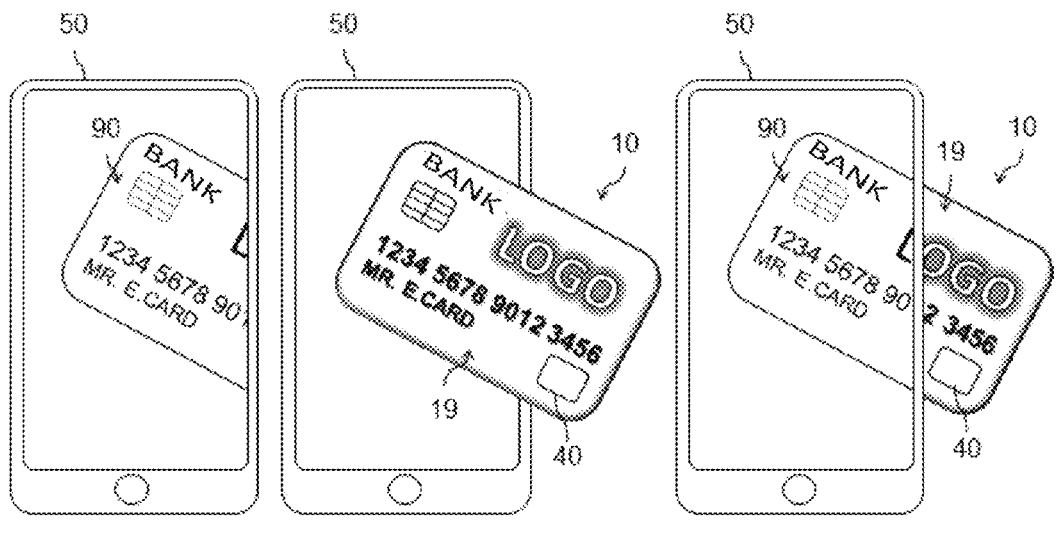
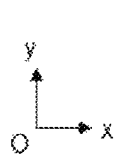
FIGURE 8
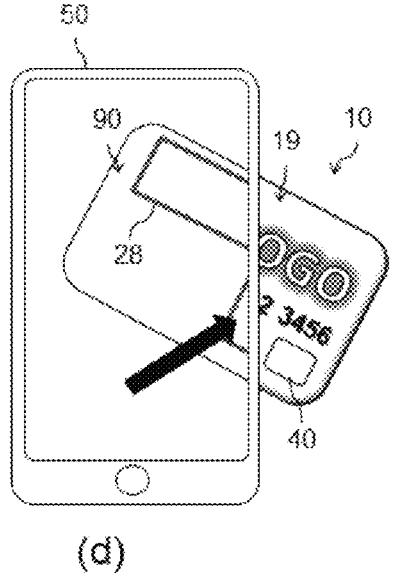

DISPLAY ON A SMARTPHONE SCREEN OF A POSITIONING PATTERN OF A CONTACTLESS CARD TO IMPROVE NEAR FIELD COMMUNICATION

TECHNICAL FIELD

The present invention concerns the field of near field communications and more particularly that of contactless cards with near field communication.

PRIOR ART

Near field communications generally relay on NFC (Near Field Communication) technology defined in the standard ISO/IEC 18092 or NFC IP-1) or ISO/IEC 14443 technology. The communication distances are in the order of a few centimeters, up to 10 cm for example, but limited at least for certain applications (for example 3 cm for contactless payments).

An increasing number of applications require a contactless card to set up a short-distance contactless communication with a mobile device, such as a smartphone, a tablet, a mobile terminal, etc. The card is generally placed close to the mobile device, on or under it. The setting up of near field communication notably makes it possible for a contactless reader (of the mobile device) to power the contactless card (without an internal battery) or complete the powering of the card (provided with an internal battery).

For example, contactless payment: a contactless payment card is brought in proximity to the contactless reader of a srnartphone in which a payment software program is executed. Communications are set up between the software program and the card which is then powered for the purpose of processing the details of the payment before they are sent by the srnartphone to a payment server.

In a medical, transport, telecom or more generally data storage application, the contactless card is approached by the contactless reader of a smartphone wherein a data visualization software program is executed. Contactless communications between the smartphone and the card then powered make it possible for a professional to access the data of the patient, the user or the subscriber, according to the situation.

When a contactless card is equipped with a biometric sensor, for example a fingerprint, the contactless card sets up a contactless communication with the smartphone in order to be powered. This is referred to as remote powering. The contactless card can then be used to acquire the fingerprints of the card carrier for security purposes.

The prints can be acquired in an initial process, so-called "enrolment", initiated by the smartphone which sends an appropriate command to the card. In this initial process, the near field communication serves mainly to continuously remotely power the contactless card. This initial process aims to parameterize the payment service on the card and in particular consists in retrieving the prints of the carrier and associating them with the card as reference data to which new data acquired by the biometric sensor for authentication purposes will subsequently be compared.

The prints can also be acquired for any application in the smartphone requiring the authentication of a user, for example for accessing secure physical areas (buildings etc.).

In another use case, the prints can also serve for controlling access to data in a smartphone.

The smartphone asks the contactless card (by a command) for the acquisition of the prints, the comparison with reference prints and the obtainment of a successful or unsuccessful item of authentication information. Once again, in this authentication process, near field communication is mainly used to continuously remotely power the contactless card.

These various applications therefore require the near field communication between the contactless card and the mobile device to be more or less long, by reason either of a volume of data to be exchanged or a continuous powering of the card. Specifically, an interruption of the communication, and therefore the powering, can, for example for safety reasons, cause a blocking of the program used on the mobile device or make it necessary to restart the whole operational phase (for example of enrolment).

Today, however, mobile devices at the most indicate only to the user that they have detected the contactless card in their NFC field, without knowing if the card is correctly positioned, i.e. preferably within the maximum field of the contactless communication interface (antenna) of the mobile devices.

It is therefore easy for the user to accidentally interrupt the communication and therefore the remote powering of the card by attempting to hold it against the smartphone. It is in particular difficult for the user to know the ideal position of the card since this depends on the position of the NFC antenna in the mobile device or again on the sensitivity (or power) of the NFC field used.

There is therefore a need to improve this situation in order to reduce the risks of injurious loss of near field communication.

SUMMARY OF THE INVENTION

In this context, the invention first of all proposes a method for near field communication between a mobile device and a contactless card, comprising the following steps:
displaying, on a screen of the mobile device, a positioning pattern,
positioning the contactless card in a first position, in proximity to the mobile device,
where a card indicator for which provision is made on the contactless card is aligned with the displayed positioning pattern, and
setting up a near field communication between the mobile device and the contactless card in the first position.

Correlatively, the invention relates to a mobile device consisting of a near field communication interface, a screen and a processor configured to display a positioning pattern on the screen,
the positioning pattern being displayed at a location of the screen such that a near field communication is set up between the mobile device and a contactless card when the contactless card is positioned in a first position, in proximity to the mobile device, where a card indicator for which provision is made on the contactless card is aligned with the displayed positioning pattern.

The invention also relates to a system including a mobile device as defined above and the contactless card.

Thanks to the pattern displayed, the user is easily guided to perform an optimal positioning of the contactless card with an effective near field communication area. The display location is specifically preferably chosen to maximize the electromagnetic coupling between the card thus positioned and the mobile device.

The remote powering of the contactless card is made more effective, reducing the risks of interruption of the near field communication even when the user is caused to handle the card. It can specifically, maintain the optimum positioning of the card owing to the alignment of the card indicator with the pattern.

In an embodiment, the positioning pattern is visually complementary to the card indicator (thus forming a predefined pattern for example), and in the first position the card indicator visually complements the positioning pattern. This arrangement allows the user to correctly position the card (partially) under or over the mobile device whie also keeping the entire use of the screen of the device.

In an embodiment, in the first position, the contactless card includes an area carrying the card indicator, which extends beyond one side of the mobile device. This arrangement facilitates the alignment insofar as the card can be partly slid under or over the mobile device.

In an embodiment, the method comprises the following steps performed by the mobile device:
obtaining an item of information representative of the contactless card,
obtaining a display location depending on the item of information obtained, and
displaying the positioning pattern on the screen in the display location obtained.

Thus, the improvement of the near field communication is made dynamic according to the type of card used.

According to an optional feature, the display location also depends on an item of information representative of the type of the mobile device.

According to another optional feature, the positioning pattern to be displayed also depends on the item of information obtained. This makes it possible to adapt the visual of the pattern (for example a logo) to that of the card.

According to a particular embodiment, the obtainment of the item of information representative of the contactless card comprises the use of a camera built into the mobile device to acquire a photo of the contactless card.

According to a particular embodiment, the obtainment of the item of information representative of the contactless card comprises the installation of a near field communication channel between the mobile device and the contactless card during which the contactless card sends an initialization message including an indication representative of the card. The user is thus not approached.

According to a particular embodiment, the display location is obtained from a third-party item of equipment distant from the mobile device, for example a banking server.

In an embodiment, the displayed positioning pattern includes a first indicator for the positioning of the contactless card along a first axis. This makes it possible to limit the positioning of the card within a preferred area of communication with an optimal field in this area. The remote powering of the card is effective.

According to a particular feature, the displayed positioning pattern includes a second indicator for the positioning of the contactless card along a second axis not parallel to the first axis. This arrangement makes it possible to guide the user toward a unique position of the card. An optimal contactless communication and an effective remote powering are thus obtained.

In an embodiment, the displayed positioning pattern includes an irregular pattern (for example without symmetry) complementary to the card indicator, so as to form a predefined pattern. This makes it possible to define a unique optimal card position using a single pattern.

In an embodiment, the displayed positioning pattern comprises a pattern for which provision is made on the card as a visual complement to the card indicator. According to a particular feature, the displayed positioning pattern comprises a partial representation of a visual of the contactless card.

These provisions facilitate the understanding by the user of how to place the card with respect to the mobile device.

Provision may be made for the card indicator on the front or the reverse side of the contactless card, according to whether the card must be used on the main face (generally that with the chip visible and with the explicit visual of the operator) upward or downward.

In an embodiment, the contactless card includes a biometric sensor in a card area which extends beyond one side of the mobile device when the contactless card is in its first position. This arrangement facilitates the use of the biometric sensor of the card in a position where the near field communication with the mobile device is effective.

Provision can be made for this area carrying the biometric sensor on the front side of the card or on its reverse side, according to the use made thereof, the area appearing face toward the user in order to facilitate access to the sensor.

In a particular embodiment, the method further comprises the following steps: displaying, on the screen of the mobile device, a second positioning pattern, positioning the contactless card in a second position, in proximity to the mobile device, where the card indicator is aligned with the second displayed positioning pattern, and setting up a near field communication between the mobile device and the contactless card in the second first position.

This provision applies particularly well to the user of the contactless biometric card on both sides of the mobile device, for example to acquire the fingerprints of the right hand and the left hand of the user.

For example, the card area including the biometric sensor extends beyond two opposite sides of the mobile device in the first and second positions respectively.

It applies equally well to the use of the contactless biometric card for the acquisition of the fingerprints of the thumb and the other fingers without having to turn over the wrist of the user.

For example in this case, the card area including the biometric sensor extends beyond the same side of the mobile device in the first and second positions, the contactless card being turned over (front and reverse side) between the first position (for example for the thumb) and the second position (for example for the other fingers).

The first and second positions can be identical (only with the card being turned over), in which case the two positioning patterns are identical and displayed in the same location. Only an instruction prompting the user to turn over the contactless card can be displayed as a guide.

Generally, the first and second positions are distinct given the shape of the thumb and the other fingers. In this case, the same positioning pattern can be used but displayed differently (other position and/or other rotation). Of course, different patterns can still be used, displayed in different positions and/or with different rotations.

Thus, for the acquisition of all the fingers of both hands, the user can be made to position the contactless cards in four different positions.

In an embodiment, the method further comprises the following steps:
detecting a positioning of the contactless card with respect to the first position, and
generating a signal of correct or incorrect positioning as a function of the detection.

Of course, this approach can be used for any envisioned card position, in particular for the various positions for which provision is made for the acquisition of all the fingerprints of both hands.

The user is thus helped in his positioning of the card, particularly when the alignment of the positioning pattern with the card indicator is not easy (for example when the edge of the screen is distant from the edge of the mobile device) or when several positioning patterns are displayed together whereas only one must be used at a given moment.

According to a particular embodiment, the detection comprises the reception, by the mobile device, of a report issued by the contactless card representative of the quality of communication between the contactless card and the mobile device. A variant to the sending of the report can consist for the contactless card of itself controlling the lighting of a diode (LED) for which provision is made on the card.

According to another particular embodiment, the detection comprises the detection, by the mobile device, of a level of electromagnetic field of a communication between the contactless card and the mobile device.

BRIEF DESCRIPTION OF THE DRAWINGS

Other peculiarities and advantages of the invention will become further apparent in the description hereinafter, illustrated by the appended figures which illustrate exemplary embodiments thereof, devoid of any limiting character.

DETAILED DESCRIPTION

The present invention promotes the correct positioning of a contactless card near a near field reader, to optimize the near field communication between these two entities and the remote powering of the card.

The examples taken below mainly describe the positioning of a dual biometric card during an enrolment process using a srnartphone.

Generally, the smartphone initiates (by sending a command) the enrolment process within the contactless card. The acquisition of the fingerprints is performed by the card itself (via a biometric sensor) which stores them locally (as reference prints).

The near field is used mainly to remotely power the contactless card during this process. This is because the card either has no internal battery but needs a maximum of power to supply its components, or possesses an internal battery, but it is desirable not to empty it during enrolment operations with a high energy cost.

It is therefore preferable to have an optimal positioning of the contactless card to ensure effective remote powering.

In variants, the fingerprints of the user can be acquired by the biometric sensor and be transmitted, by near field communication, to an enrolment program executed in the smartphone.

A dual card possesses two communication interfaces, one with contact and the other contactless of NFC or ISO/IEC 14443 type. The invention however applies to any type of contactless card, whether or not it has an interface by contact and/or a biometric sensor.

The smartphone is a mobile device capable of communicating in a near field with a contactless card when the smartphone is equipped with an NFC or ISO/IEC 14443 communication interface. The invention however applies to any type of mobile device, including a mobile telephone, a touch-sensitive tablet, a contactless payment terminal, a laptop computer, a camera etc.

The enrolment process is only used by way of example of an operation during which a near field communication is implemented between the smartphone and the contactless card. The invention however applies to any type of operation requiring such a communication. In particular, the contactless card can be used for many applications, for example applications of payment, transport, telecommunications, medical, storage etc.

Figure 1:
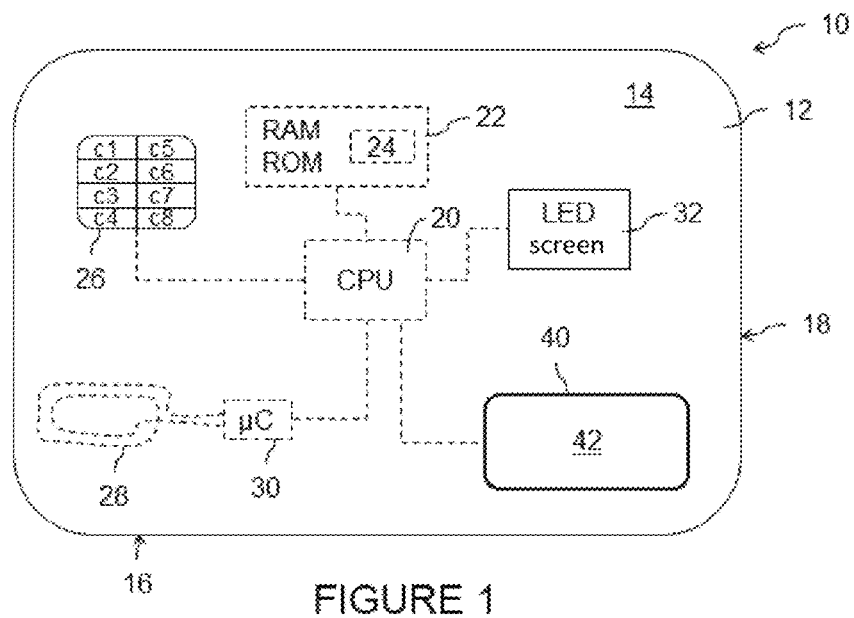
FIG. 1 illustrates an example of a contactless card taking the form of a dual biometric payment card.

FIG. 1 shows an example of a biometric dual payment card 10. In this example the components shown in dotted lines are generally hidden in the card body 12 whereas the components shown in solid lines are visible.

The card 10 includes a plastic card body 12, of which a main surface (here the front face) 14 generally includes graphic inscriptions, typically, the name of the carrier, a card number, and a logo. These inscriptions can have been made by simple pressing on the plastic support 12, by deposition of graphic elements and/or by embossing. The visual of the card 10 thus constitutes an irregular pattern.

The reverse of the card can also have a specific visual.

The card 10 can be in the 1FF format in the sense of the standard ISO/IEC 7810: 2003, ID-1 and thus have a substantially rectangular shape. Its long edges are referenced 16 and its short edges 18.

The card 10 includes an electronic module (CPU) 20 and associated memories (RAM, ROM) 22 storing code instructions 24 for the operation of the card, in particular an enrolment program. In general, a program of different type from the enrolment can be envisioned.

It also includes one or more interfaces for communication with the outside, for example a set of terminals or contact pads 26 flush with the upper surface 14 and an antenna 28 controlled by a microcontroller (µC) 30 for contactless communication.

The interface 26 is preferably compliant with the standard ISO/IEC 7816-2: 2007. The interface 26 is composed of eight electrical contacts distributed according to a matrix pattern of two columns and four rows. To each position in the matrix there corresponds an electrical contact position denoted c1 to c8 according to the standard. Conventionally, the contacts c1 and c5 of the first row are used for the purposes of powering the card whereas the contacts c4 and c8 are not used.

The interface 28-30 is compliant with the NFC (Near Field Communication) standard defined in the standard ISO/IEC 18092 or NFC IP-1) or ISO/IEC 14443.

When the card 10 is presented to a reader (by contact or contactless), it is powered by the latter via the corresponding interface. The term "remote powering" is used if the powering is done by the contactless interface. The code instructions 24 can then be executed automatically or on command.

The card 10 also includes one or more biometric sensors 40 and optionally one or more user interfaces 32, typically LEDs and/or a display unit, to inform the user about different statuses or information of the card.

The different components are interconnected by one or more computer buses.

The biometric sensor 40 includes an acquisition area 42, generally flush with the upper surface 14 of the card 10. In a variant, provision can be made for the biometric sensor 40 on the opposite face of the card (lower face).

In the example shown, the biometric sensor 40 is a capacitive fingerprint sensor, for example manufactured as per the method described in the publication FR 3 061 333 A1.

Other biometric sensors can be used, for example non-exhaustively an optical sensor, a brightness sensor, a multispectral imaging sensor or a thermal sensor, Conventionally, payments by card are secured using a personal code (PIN) that the user must input for example on a terminal. This inputted code is then compared to a reference PIN code stored in the card, allowing to authenticate the carrier if the comparison is positive.

The biometric payment card 10 makes it possible to replace the use of the PIN code with the biometric authentication of the carrier using the biometric sensor 40.

Reference biometric data of the user must be acquired during an initial configuration to be stored in the card 10. This is the enrolment operation during which the user acquires the fingerprints of all or part of his fingers. It is specifically these reference prints that will be used as reference data to which will be subsequently compared new data acquired by the biometric sensor 40 for authentication purposes, during a transaction.

The reference prints are generally stored in the card, and in a variant in the mobile device used or in a remote server.

Figure 2:
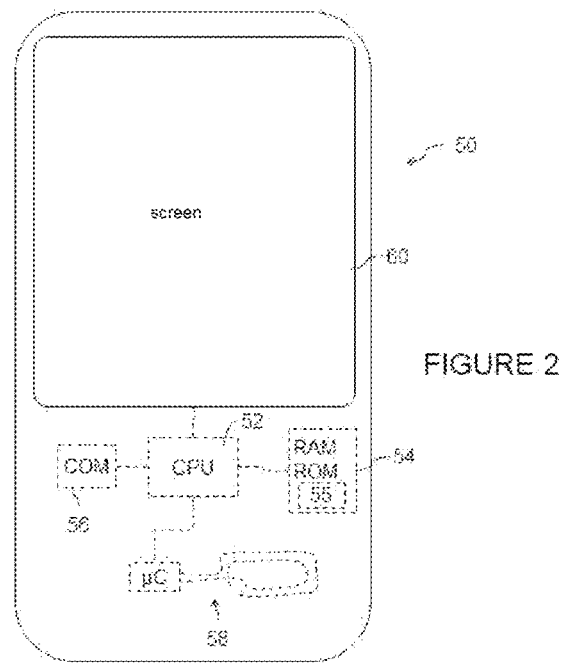
FIG. 2 illustrates an example of a mobile device taking the form of a smartphone.

To perform this enrolment operation, the user can bring the card 10 close to a terminal or mobile device 50 such as that shown, in the form of a smartphone, in FIG. 2.

Conventionally, the smartphone 50 incudes a processing unit CPU 52, associated memories (RAM, ROM) 54, a module COM 56 for communication over an external network, an interface 58 for contactless near field communication, including an antenna controlled by a microcontroller (μC), and a screen 60. Other conventional elements (for example battery, keyboard, SIM card etc.) are not shown for greater clarity.

The memories 54 store code instructions 55 for the operation of the card when executed by the CPU 52, particularly an enrolment program complementary to the program 24 of the card 10.

Figure 3:
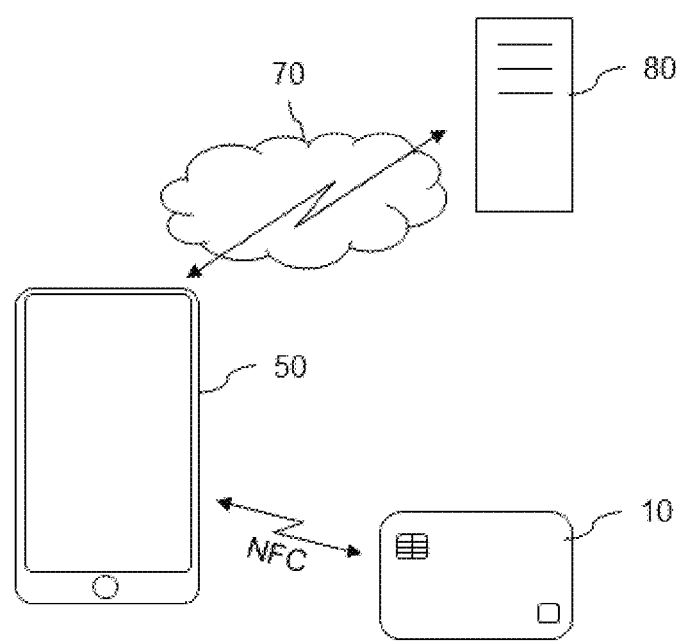
FIG. 3 illustrates an example of a system for an implementation of the invention.

The module COM 56 is a radio-telephone module for access to a mobile telephony network, a digital communication module for access to a WiFi or a digital wired network, or a module for access to any other network 70, wireless or otherwise. As shown in FIG. 3, the network 70 allows the smartphone 50 to access one or more remote servers 80 for implementations of the invention.

The contactless or NFC interface 58 of the smartphone 50 is of the same nature as the contactless interface 28/30 of the card 10, thus allowing the smartphone and the card 10 to set up near field communications.

The location of the NFC interface 58 in the smartphone varies according to the model of smartphone (in general according to the type of mobile device 50). It is generally arranged in the back part of the smartphone (the opposite face to that of the screen 60).

When the card 10 enters the field of the NEC interface 58, the card 10 is powered by electromagnetic induction (remote powering), triggering a procedure of initialization of a near field communication. The smartphone 50 detects on this occasion the presence of the card 10.

In response, particularly on the first powering of the card, the enrolment program 24 can be executed.

The user can manually launch the execution of the complementary enrolment program 55, for example when an indication of the detection of the card 10 is displayed by the smartphone 50 on the screen 60.

In a variant, the program 55 can be launched automatically on detection of the card. In the same way, the launching of the program 24 in the card can be triggered by a deliberate action of the user in the enrolment program 55.

The enrolment program 55 guides the user through the enrolment steps.

The enrolment operation is long since it requires the card 10 to be handled several times to successively place the fingers of the user, especially since to obtain precise reference prints it can be recommended to acquire the prints of one and the same finger several times.

During this operation, the components (particularly the biometric sensor) are heavily used. The contactless card therefore consumes a good deal of electrical energy remotely supplied by the smartphone 50.

If the card 10 happens to be incorrectly positioned with respect to the interface NEC 58, the quality of the remote powering and the quality of the near field communication are reduced thereby. However, the low range of the NEC, of a few centimeters, leads quite easily to a deterioration of the remote powering insufficient for the correct operation of the components of the card, or even to power cuts, as well as to a large number of involuntary errors of communication, if it is incorrectly positioned. These deteriorations and errors may lead to the interruption or blocking of the enrolment operation.

The present invention supplies an aid to the correct positioning of the card 10 in proximity to the smartphone 50, to optimize near field communication between these two entities, and therefore remote powering.

According to the invention, at least one positioning visual (or graphic) is displayed on the screen 60 of the smartphone. Owing to this visual marker, the user is guided to position the card 10 toward a first position, in proximity to the smartphone 50, allowing a good-quality near field communication to be set up between the mobile device and the contactless card in the first position. The card is generally maintained in a plane parallel to the main plane of the smartphone 50 (usually the plane formed by the surface of the screen or the back casing). The card can be on the upper face 14 oriented toward the user or be turned over (face 14 hidden from the user).

To reach this first position, a card indicator for which provision is made on the contactless card must be aligned with the displayed positioning pattern. The user is thus entirely guided. This precise positioning is reproducible and can be continuously verified while the user handles the card 10 to, for example, acquire his fingerprints.

Figure 4:
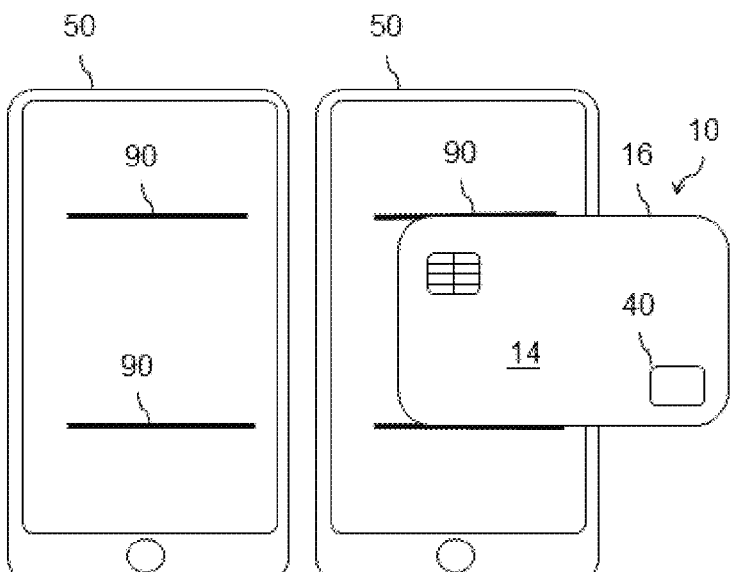
FIG. 4 illustrates a first example of a positioning pattern according to the invention displayed on the screen of a smartphone 50.
Figure 4:
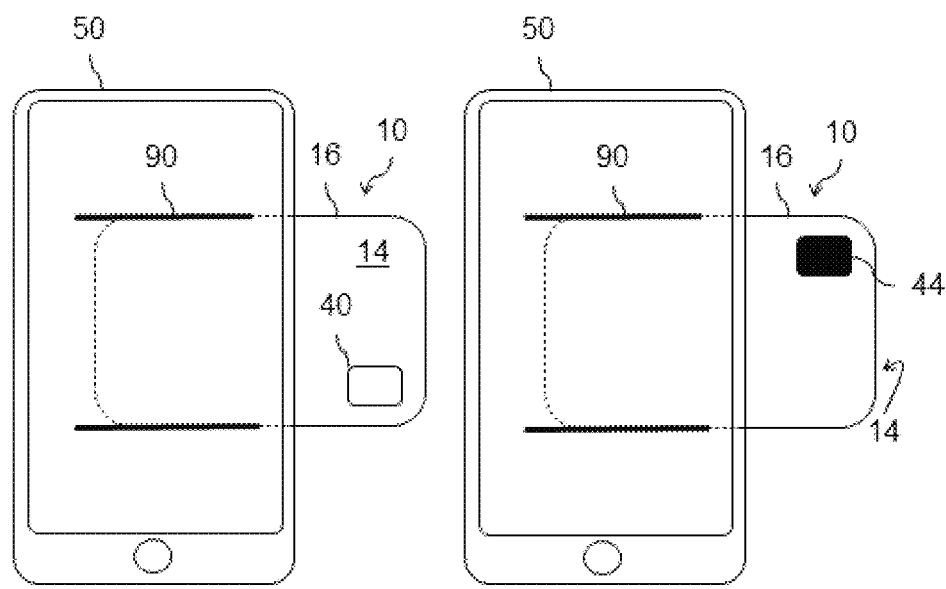
Figure 4:
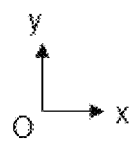

FIG. 4 illustrates a first example of a positioning pattern 90 displayed on the screen of the smartphone 50 of which the NFC module 58 is positioned substantially in its center.

In this example (FIG. 4*a*), the positioning pattern takes the shape of two parallel lines or segments separated by one card width. In a variant, only one of the two segments can be displayed. These segments form indicators for the positioning of the contactless card 10 along a first axis (O,y) in the plane of the card.

Patterns other than segments can be used, for example dots, reference points, marks, images etc.

The user can then place the card 10 on the screen 60 such as to make the shape of the card correspond with the positioning pattern 90, in the example by aligning the edges 16 with the segments 90 (FIG. 4*b*). The edges 16 of the card 10 thus serve as card indicators for the positioning thereof.

It should be noted that the ends of the segments on the left in the figure form a pattern that is visually complementary to the card indicator (the edges 16) and together form a predefined pattern, here a solid line.

In a variant, the user can bring the card 10 near under the smartphone 50 and hold it against the lower casing thereof. Here again, the user visually aligns the edges 16 with the segments 90 (FIG. 4*c*). In this case, the positioning pattern (segments 90) is visually complementary to the card indicator (right-hand part of the edges 16), and in the first position as illustrated in the Figure, the complementary card indicator visually complements the positioning pattern. Specifically, the segments 90 and edges 16 are aligned.

In this position, the card 10 includes an area carrying the indicator (edges 16) of the card, which extends over one side of the smartphone 50. In this example, this part further carries the biometric sensor 40, allowing its use in this optimal near field communication position.

In this example, provision is made for the segments 90 such that the card 10 is placed perpendicular to the smartphone 50 (their longitudinal axes are orthogonal). Other positions can be envisioned: longitudinal axes which are parallel or pivoted by any angle.

Also, although the card 10 in the illustrated position is with the upper face 14 oriented toward the user (upward), it may be envisioned that the card 10 is turned over, with the face 14 downward. This is what is illustrated in FIG. 4*d* (also applicable in the case where the card is positioned on the smartphone) where provision is made for a visual marker 44 (here a black rectangle—but any type of marker can be envisioned) on the back face of the card in a manner co-located with the biometric sensor 40. That helps the user to correctly position his fingers on the non-visible sensor 40.

In addition, this turning over can be performed during the enrolment process to facilitate the acquisition of the fingerprints of the thumb (with the face 14 upward) and the other fingers (with the face 14 downward) without the user having to twist his wrist.

Figure 5:
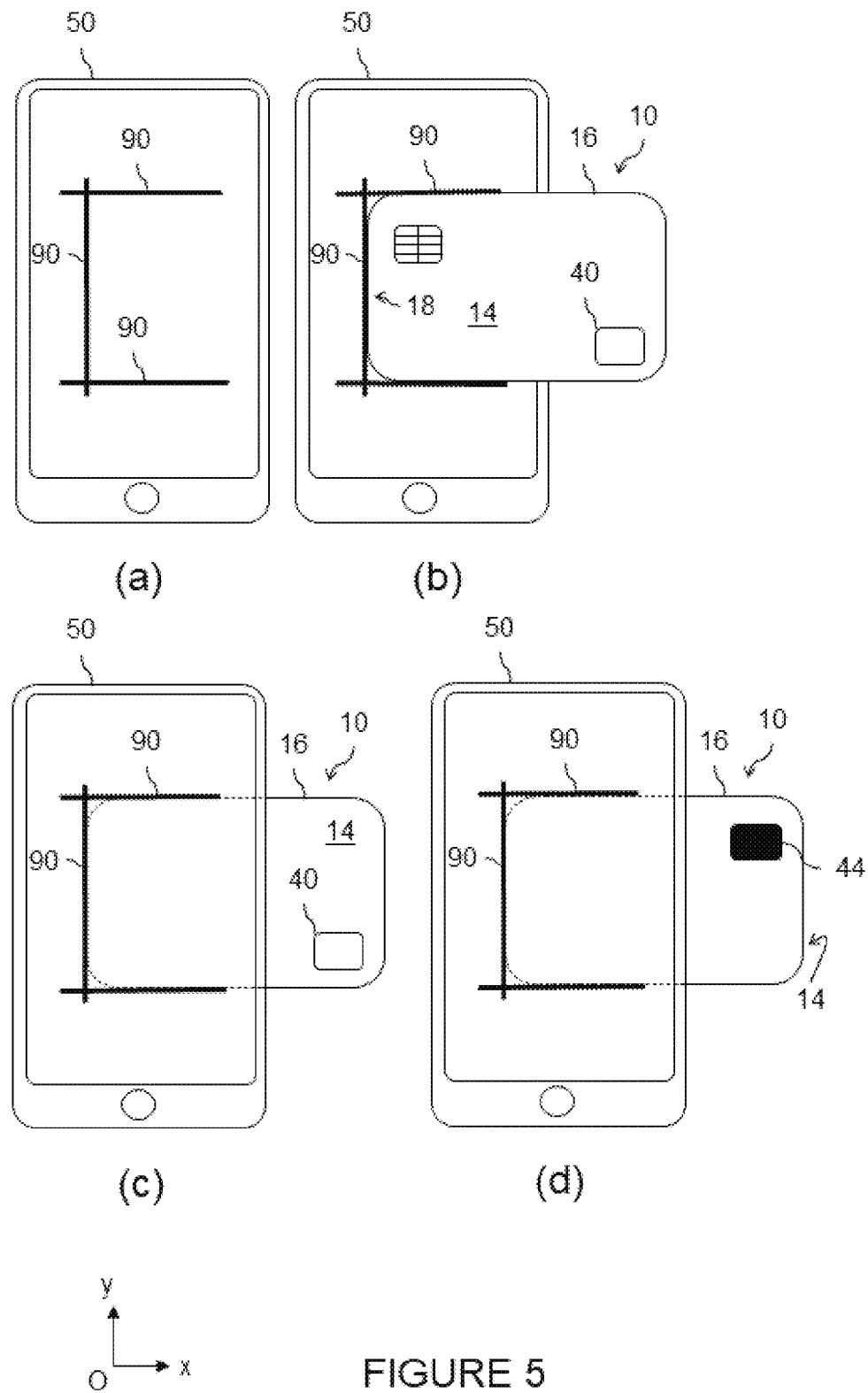
FIG. 5 illustrates a second example of a positioning pattern according to the invention displayed on the screen of a smartphone 50.

FIG. 5 illustrates a second example of a positioning pattern 90 displayed on the screen 60 of the smartphone 50, the NFC module 58 of which is positioned substantially in its center. The pattern comprises the same segments as those of the first example of a pattern in FIG. 4 and further comprises a second pattern, here a vertical segment, for the positioning of the card 10 along a second axis (O,x) in the plane of the card and not parallel to the first axis (O,y). In this example (FIG. 5*a*), the segments are perpendicular and intersect one another. In a variant, the segments can be shorter and not intersect one another.

The user can then use the edge 18 to align the card 10 with the vertical segment 90 (FIG. 5*b*). The ends of the vertical segment form a pattern which is visually complementary to the edge 18 of the card and together form a predefined pattern, here a solid line.

This vertical segment 90 also helps the user to assess the depth to which the card 10 should be pushed down under the smartphone 50 (FIG. 5*c*).

Again, other positions can be envisioned for the segments 90 as well as the positioning of the card with the upper face 14 upward (FIG. 5*c*) or downward (FIG. 5*d*), as described above.

In a variant to segments 90, the contours of a card can be displayed on the screen 60 as a positioning pattern.

Figure 6:
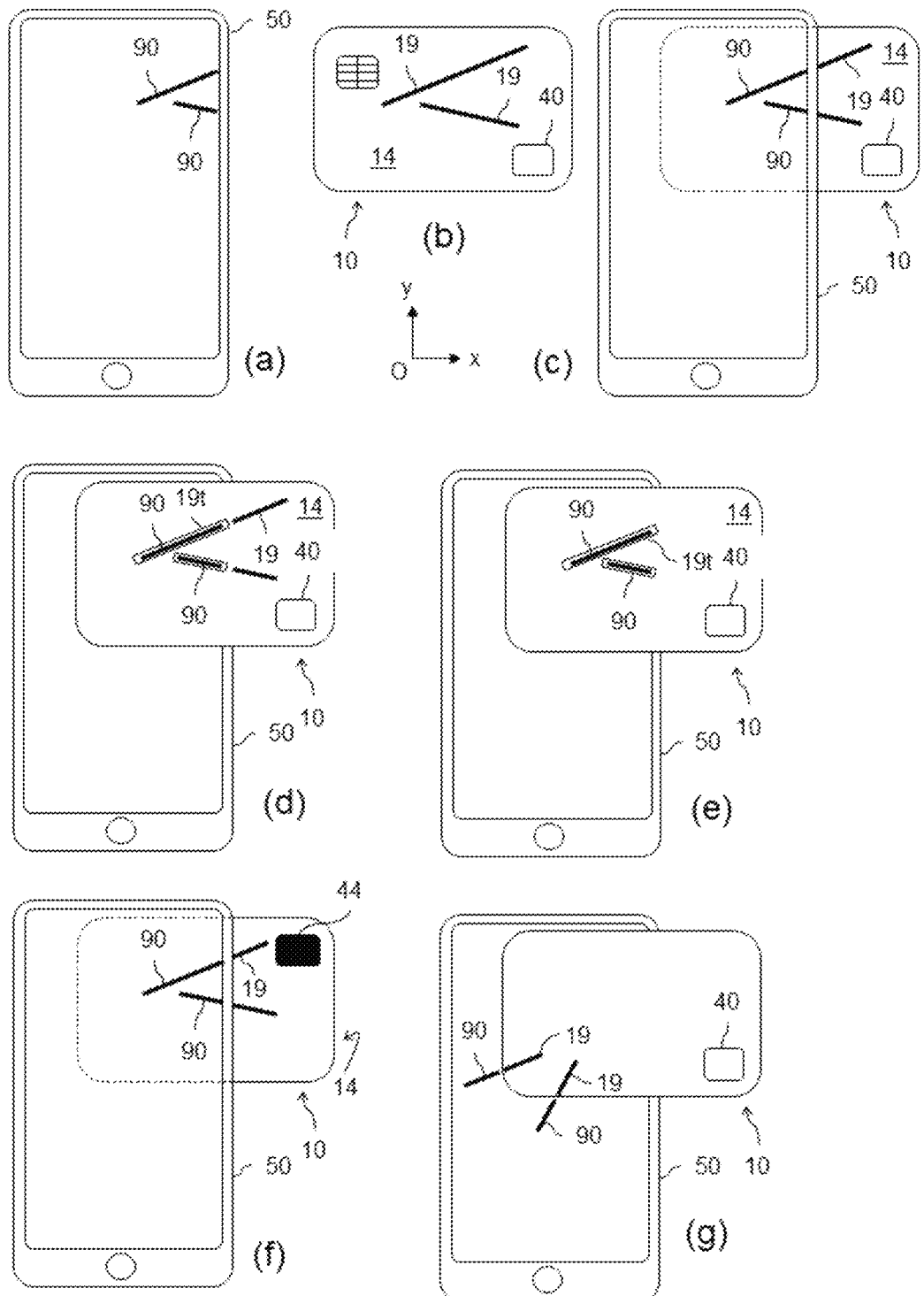
FIG. 6 illustrates other examples of positioning pattern according to the invention displayed on the screen of a smartphone 50.
Figure 6:
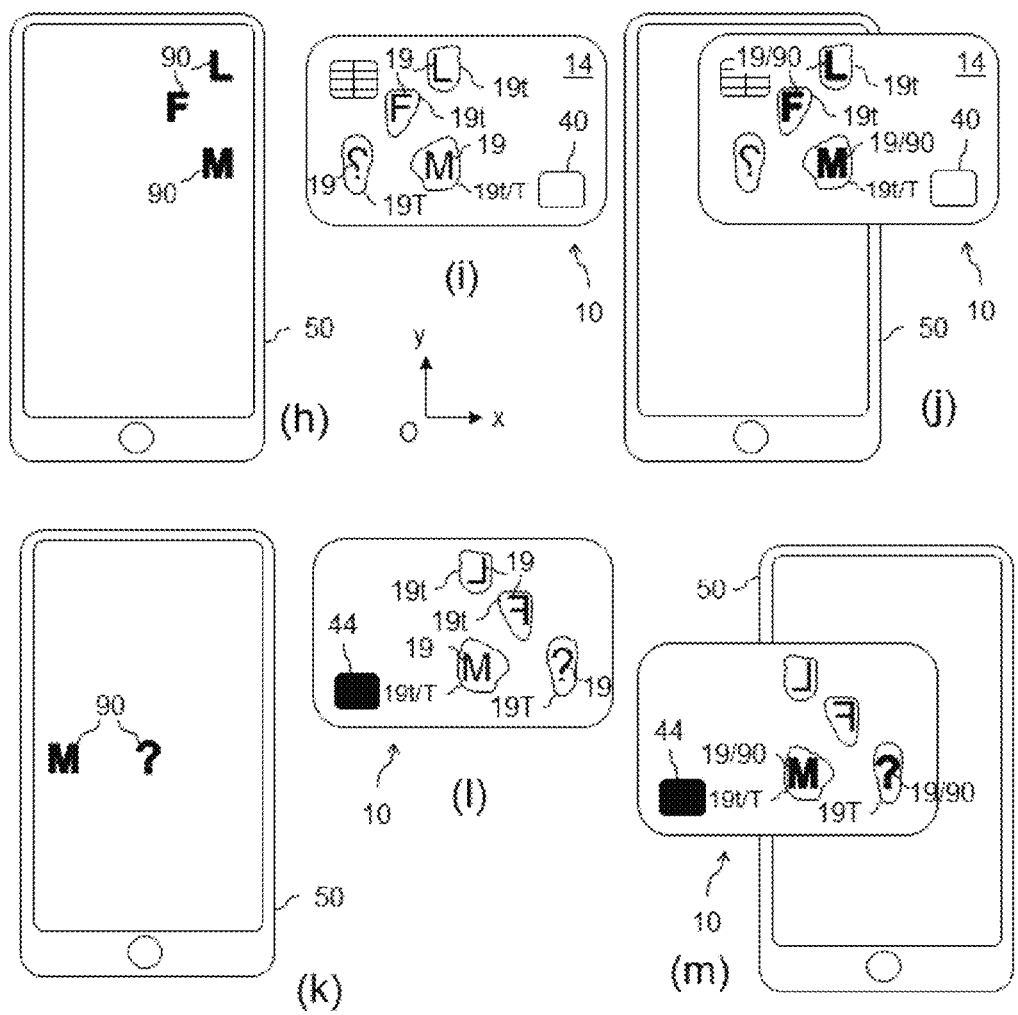

FIG. 6 illustrates a third example of a positioning pattern 90. In this example the NFC module 58 is positioned toward the top of the smartphone 50. It can thus be seen that the displaying position of the pattern can vary from one smartphone to the other to take into account the location of the NFC module.

This third example of a positioning pattern 90 also includes two indicators (segments) displayed along two non-parallel axes, here non-perpendicular. Both the displayed segments can intersect or otherwise.

The positioning pattern 90 can be displayed up to the edge of the screen 60 on the side where the card 10 must be positioned (FIG. 6*a*). This makes it possible to perform a better positioning when the card 10 is slid under the smartphone 50.

In this example, the positioning pattern 90 corresponds to a sub-part of a card indicator 19 (here pattern) for which provision is made on the card 10 (FIG. 6*b*). Thus, the pattern 90 comprises a pattern for which provision is made on the card as a visual complement to the card indicator. In a variant, provision can only be made on the card 10 for the complementary sub-part of the positioning pattern 90 (therefore only the visible part in FIG. 6*c*).

The card indicator 19 can simply be printed on the upper face 14 of the card, be an added element (bonded layer, punched element etc.) or result from an embossing of the card 10.

In a variant, the card indicator may comprise one or more transparent portions 19*t* (here two rectangles) in addition to the indicator 19 described above (FIG. 6*d*) or in place of the indicator 19 (FIG. 6*e*). The user now only has to align the pattern 90 displayed with the transparent portions and/or with the indicator 19 if present (card on the smartphone). The transparent portions can be made of a transparent material in the bulk of the card body 12 or be simple through openings in the card body. The portions 19*t* illustrated are two rectangles. Other shapes can of course be used (for example geometrical shape, drawing, image, logo etc.)

In another variant allowing the positioning of the card with the upper face 14 downward, provision is made for the indicator 19 on the back face of the card with where applicable the marker 44 (FIG. 6*f*), as described above. In this variant, the indicator 19*t* can be used in combination or not in combination with the indicator 19 following the positioning of the card respectively on or under the srnartphone 50.

In the various cases, the positioning pattern 90 is visually complementary to a card indicator (either the whole indicator 19 or the complementary under-part). Thus, in the first position, the card indicator 19 visually complements the positioning pattern 90. In reality, the positioning pattern 90 includes an irregular pattern complementary to the card indicator 19, so as to form a predefined pattern (that illustrated in FIG. 6b). A pattern can be considered as irregular if it does not have any apparent symmetry. Such a pattern makes it possible to define a unique position for the card 10.

FIG. 6g proposes a variant wherein the card 10 can be placed on the smartphone 50 (and not slid under it). The two segments forming the positioning pattern 90 are visually complementary to the indicators 19 for which provision is made on the card.

Again, a simple alignment of the segments is sought by the user to correctly position the card 10.

FIG. 6g also applies to a positioning of the card with the upper face 14 downward, provision being made for the indicator 19 and/or the indicator 19t on the back face of the card with where applicable the marker 44 (shown in FIG. 6f).

In the positions shown in FIGS. 6c, 6d, 6f, the card 10 also includes an area carrying the card indicator 19, which extends beyond one side of the smartphone 50. In this example, this area further carries the biometric sensor 40, allowing its use in this optimal near field communication position. Again, the card 10 can be with the upper face 14 turned downward such that the biometric sensor 40 is not visible. The card 10 can then comprise on its back face (visible to the user) the marker 44 in addition to a card indicator 19 allowing it to be positioned by alignment with the pattern 90.

Provision can also be made for a transparent indicator 19t.

A variant of FIG. 6d is illustrated in FIGS. 6h to 6m. In this variant, provision is made for the indicator 19 on the transparent area 19t (constituted of a transparent material in the thickness of the card 10).

The card 10 has at least one transparent portion (19t—three in the example illustrated in FIG. 6i) which includes an indicator 19 as already described (for example inscription, logo, image, shape etc.)

In this example, the positioning pattern 90 displayed corresponds to the indicators 19 for which provision is made on the transparent portion or portions 19t (FIG. 6h). The user comes to place the card 10 (upper face 14 upward) on the smartphone 50 taking care to superimpose or make overlap, that is to say, to align the indicator 19 of the portion or portions 19t with the pattern 90, owing to the transparency of the portion 19t (FIG. 6j).

In the illustrated example, several (three) separate transparent portions 19t include letters (here F, M, L—which could be other patterns) to be aligned on the corresponding letters of the displayed pattern 90. To facilitate the alignment, the letters of the pattern 90 are displayed more boldly than those of the indicators 19.

The indicator 19 can be simply printed or bonded onto the transparent material of the portion 19t, either on the upper face 14 (for better visibility), or in mirror image on the lower face of the card (for a more accurate positioning on the pattern 90 as described below).

In a variant, the indicator 19 can be embedded, by punching, into the transparent material of the portion 19t over all or part of the thickness of the card, flush or not to the surface of the card, on the upper face 14 and/or on the lower face of the card.

The card 10 includes one or more other transparent portions 19T intended to be used when the card is turned over (upper face 14 downward). The portion 19T also includes an indicator 19 (inscription, logo image, shape etc.) which is printed or bonded, either on the lower face (for better visibility), or in mirror image on the upper face 14 of the card (for a more accurate positioning on the pattern 90 as described below). The variant of embedding of the pattern 19 as given above is also applicable for the transparent portions 19T.

The use of oriented indicators 19 (typically letters or figures or logos) allows the user to easily identify those to be used to position the card, which is either turned over or not (FIGS. 6i and 6l).

Advantageously, an indicator 19 can be symmetrical (the "M" in the example) such that it can be used for the positioning of the card, which is either turned over or not. The transparent portion is referenced 19t/T. In a simplified embodiment, provision may be made for only the corresponding transparent portion 19t/T on the card 10.

In the illustrated example, the positioning pattern 90 displayed (FIG. 6k) corresponds to the indicators 19 for which provision is made on the transparent portion or portions 19T. The user then places the card 10 turned over on the smartphone 50 taking care to superimpose or cause to overlap, i.e. to align, the indicators 19 of the portion or portions 19T with the pattern 90, owing to the transparency of these portions 19T (FIG. 6m).

A marker 44 for which provision is made on the reverse side of the card 10 allows the user to easily position his fingers for an acquisition by the biometric sensor 40 for which provision is made on the other face of the card.

In these examples, the transparent portion or portions 19t, 19T encompassing the indicator or indicators 19 facilitate the positioning, by transparency, of these indicators 19 on the corresponding positioning pattern or patterns 90.

Figure 7:
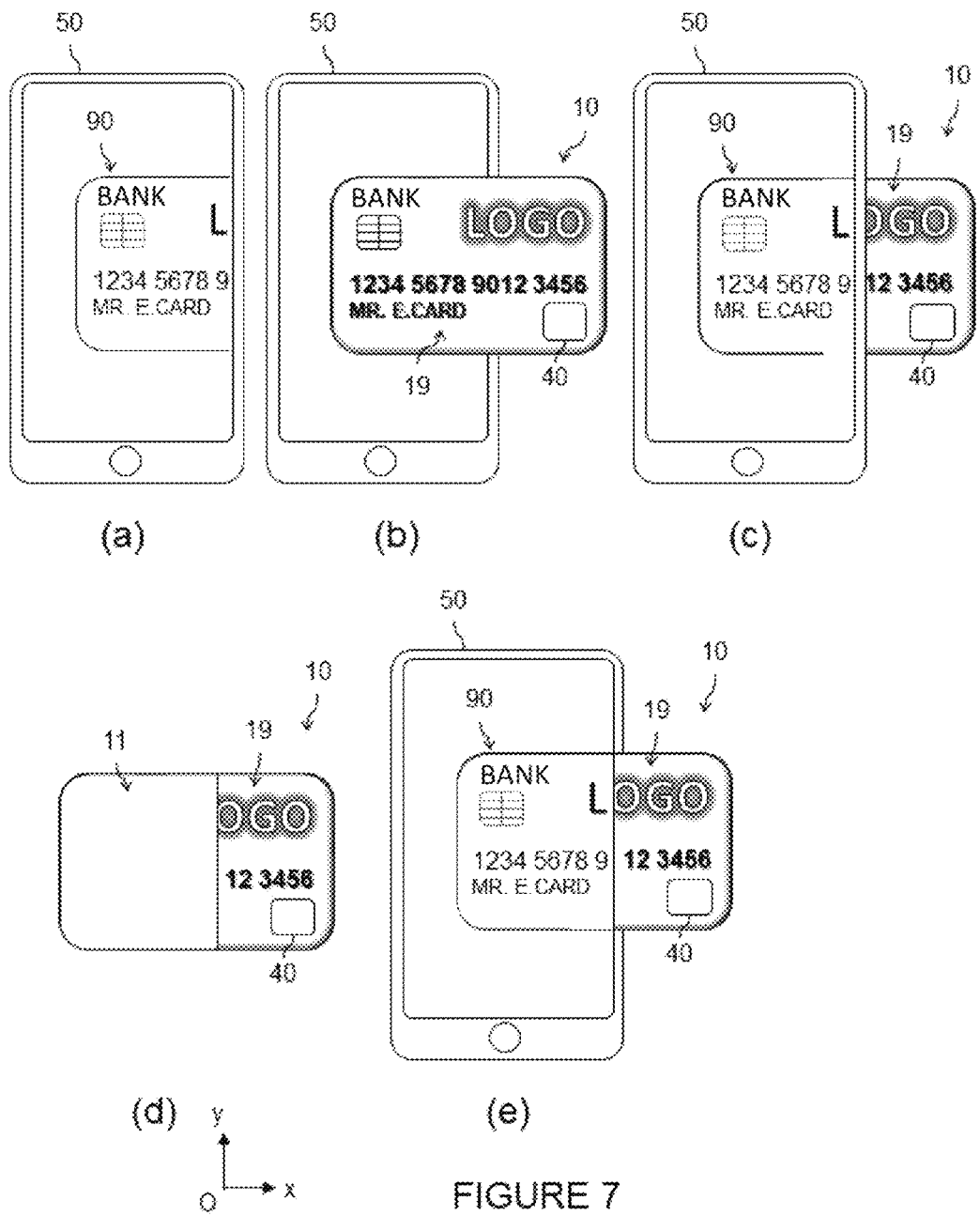
FIG. 7 illustrates a fourth example of a positioning pattern according to the invention displayed on the screen of a smartphone 50.

FIG. 7 illustrates a fourth example of a positioning pattern 90 based on the visual of the card, i.e. the illustration formed on the upper face 14 of the card 10.

The positioning pattern 90 illustrated in the Figure is a partial representation of the visual 19 of the card 10 (FIG. 7b) displayed up to the edge of the screen 60 on the side where the card 10 must be positioned (FIG. 7a). The visual 19 is for example formed by the contacts list 26, the name of the bank, a logo, a card number, a name of the card carrier. Of course, provision can be made for other information. Also the color of the card 10 can be part of the visual 19.

The card indicator used for the positioning then corresponds substantially to the missing piece of the visual of the card according to this partial representation. The positioning pattern 90 is therefore visually complementary to the card indicator (the piece which projects as illustrated in FIG. 7c), so as to form a predefined pattern, here the visual of the card 10. Thus, in the first sought position, the card indicator 19 visually complements the positioning pattern 90. In reality, the user now only has to seek to reconstitute the visual of the card 10 by positioning the latter as a visual complement to the part displayed by alignment of the card indicator 19 with the pattern 90.

In this example of FIG. 7c, the piece of the card 10 carrying the card identifier 19 is also the carrier of the biometric sensor 40 and extends beyond one side of the smartphone 50.

The partial representation of the visual 19 on the screen 60 to form the positioning pattern 90 can be identical to the corresponding piece of visual (for example coming from a photo of the card).

It can in a variant be modified with respect to the piece of visual, particularly to not contain information specific to the card (name of the carrier, card number, or even name and logo of the bank) for the case where the pattern 90 is applicable to a generic type of card. In this case, these specific items of information can be omitted or be visually replaced by default information.

The modifications can also comprise graphic simplifications, for example removal of colors, simplified font, schematic logo etc.

FIG. 7d illustrates a card 10 (with or without contacts 26) formed of a transparent portion 11 and a portion acting as card indicator 19.

The transparent portion 11 is the card portion intended to overlap with the screen 60. It is formed of a transparent material making it possible to see the positioning pattern 90 by transparency (FIG. 7e), and thus to easily position the card. The transparent material does not make it impossible to see certain electronic components (not illustrated) in the transparent portion 11, typically windings of the antenna 28.

Here again, the card indicator 19 visually complements the positioning pattern 90 (seen through the transparent portion 11) to form a predefined pattern.

Again, the card 10 can be with the upper face 14 turned downward such that the biometric sensor 40 is not visible. The card 10 can then comprise on its back face (visible to the user) the marker 44 in addition to a card indicator 19 allowing its positioning by alignment with the pattern 90.

Figure 8:
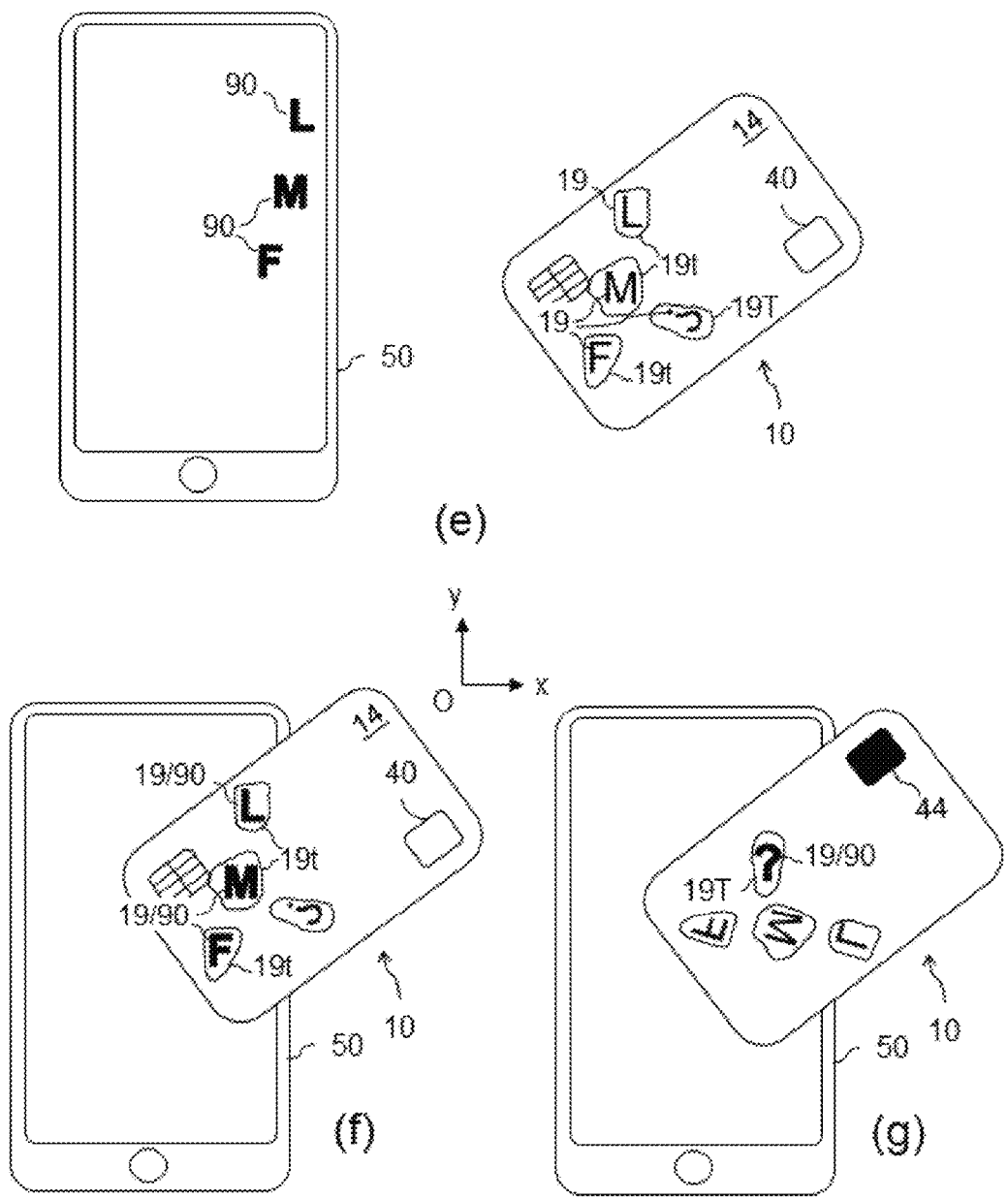
FIG. 8 illustrates variants of the positioning patterns of FIGS. 6 and 7 to define a pivoted position of the contactless card.

FIG. 8 repeats the positioning pattern 90 of FIG. 7 when it is used to define a pivoted position (FIGS. 8a, 8b, 8c) of the card 10 (the longitudinal axes of the card 10 and the smartphone 50 are neither parallel nor orthogonal).

According to the configuration of the antenna 28 of the card 10 and of the antenna 58 of the smartphone 50, the best electromagnetic coupling can specifically be obtained by rotation of the card 10. In the illustrated example (FIG. 8d showing an example of an antenna configuration 28 at the level of the part of the card placed under the smartphone), this rotation makes it possible to perform a coupling with the part of the antenna 28 shown by the bold black arrow, which is not the case in the position of FIG. 7c.

Again, the card 10 can be formed of a transparent portion 11 and a portion acting as card indicator 19.

Also, the card 10 can be with the upper face 14 turned downward such that the biometric sensor 40 is not visible. The card 10 can then comprise on its back face (visible to the user) the marker 44 in addition to a card indicator 19 allowing its positioning by alignment with the pattern 90.

The variant of FIGS. 6h to 6m also applies to a pivoted positioning of the card as illustrated in FIGS. 8e, 8f, 8g, with its upper face 14 being able to be turned downward (FIG. 8g) or not (FIG. 8f). The biometric sensor 40 may be visible or otherwise, and provision can be made for a marker 44 on the face opposite to the sensor, as described previously.

The determination of the position (including the orientation) of the card 10 offering the best coupling with a type of mobile device 50 can be performed empirically and/or systematically by testing a set of contactless cards (for example several known types) with a set of mobile devices (for example several known types), in a configuration with the upper face 14 turned upward or turned downward.

The positioning information (including the orientation) of the positioning pattern 90 for which provision must be made (complementary to a chosen card indicator 19) are thus determined and may be stored in the form of recordings in the server 80 (by grouping together, for example, all the positions of the different types of card by type of mobile device) or directly into the smartphone 50 (all the positions of the different types of cards for this smartphone only).

Figure 9:
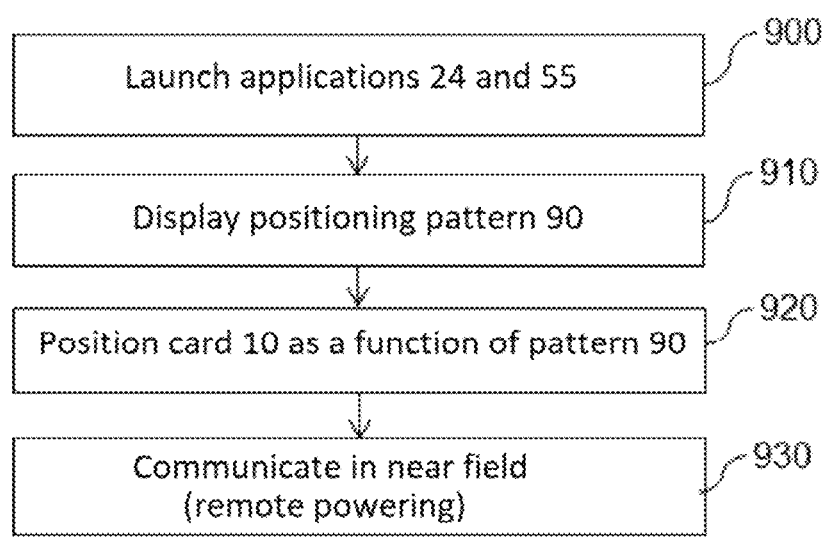
FIG. 9 illustrates, using a flowchart, the general steps of a method according to the invention.

FIG. 9 illustrates, using a flowchart, the general steps of a method according to the invention. They allow contactless near field communication which is effective between a contactless card 10 and a smartphone 50.

These general steps apply for example to a smartphone 50 preconfigured for a particular contactless card 10. This preconfiguration makes provision for the position (including a rotation, where applicable) of the positioning pattern 90 and the latter to be predefined in the smartphone 50.

In the step 900, the applications 24 and 55 requiring a near field communication are launched. This may be a deliberate action of the user on the smartphone 50 or a response to the detection of the card 10 in the NFC field of the smartphone or to any other command or event.

These applications are for example complementary enrolment applications.

In a first type of operation, the application 55 drives the execution of the enrolment application 24 by sending it commands in a sequence of enrolment steps, and by receiving statuses in response.

In a second type of operation, the application 55 reads, in the card 10, an item of information representative of the sequencing of the enrolment steps. In other words, the card 10 can update this item of information gradually with the transition from one step to the other during the enrolment, allowing the application 55 reading this information to know the progress of the enrolment, for example to display the appropriate instructions to the user.

In the step 910, a positioning pattern 90 (for example any one of FIGS. 4 to 8) is displayed on the screen 60 in the predefined location.

In the step 920, the user brings the contactless card 10 in proximity to the smartphone 50 making sure that the card indicator 19 for which provision is made thereon is aligned with the displayed pattern 90. Examples of alignment, by superimposition or complementation, are described above.

In the alignment position, the NFC communication between the contactless card 10 and the smartphone 50 is maximal.

Thus, in step 930, the remote powering of the card 10 and the NFC exchanges can take place effectively.

In the case of enrolment for example, the application 55 commands the acquisition by the remotely powered card 10 of the fingerprints of the user using the biometric sensor 40 laterally projecting from the smartphone 50. Each successful acquisition is indicated by the application 24 through a status message allowing the application 55 to prompt the user to again acquire the fingerprints of the current finger (each finger being for example acquired eight times) or to change finger.

In the variant linked to the second type of operation, at each successful acquisition the value of an item of information representative of the step is modified in the card 10 allowing the application 55 reading this value to move to the following enrolment step and to consequently prompt the user to again acquire the fingerprints of the current finger (each finger being for example acquired eight times) or to change finger.

At any moment, when he handles the card 10 to perform these acquisitions, the user can readjust the position of the card 10 using the positioning pattern 90 which remains displayed on the screen 60.

Figure 10:
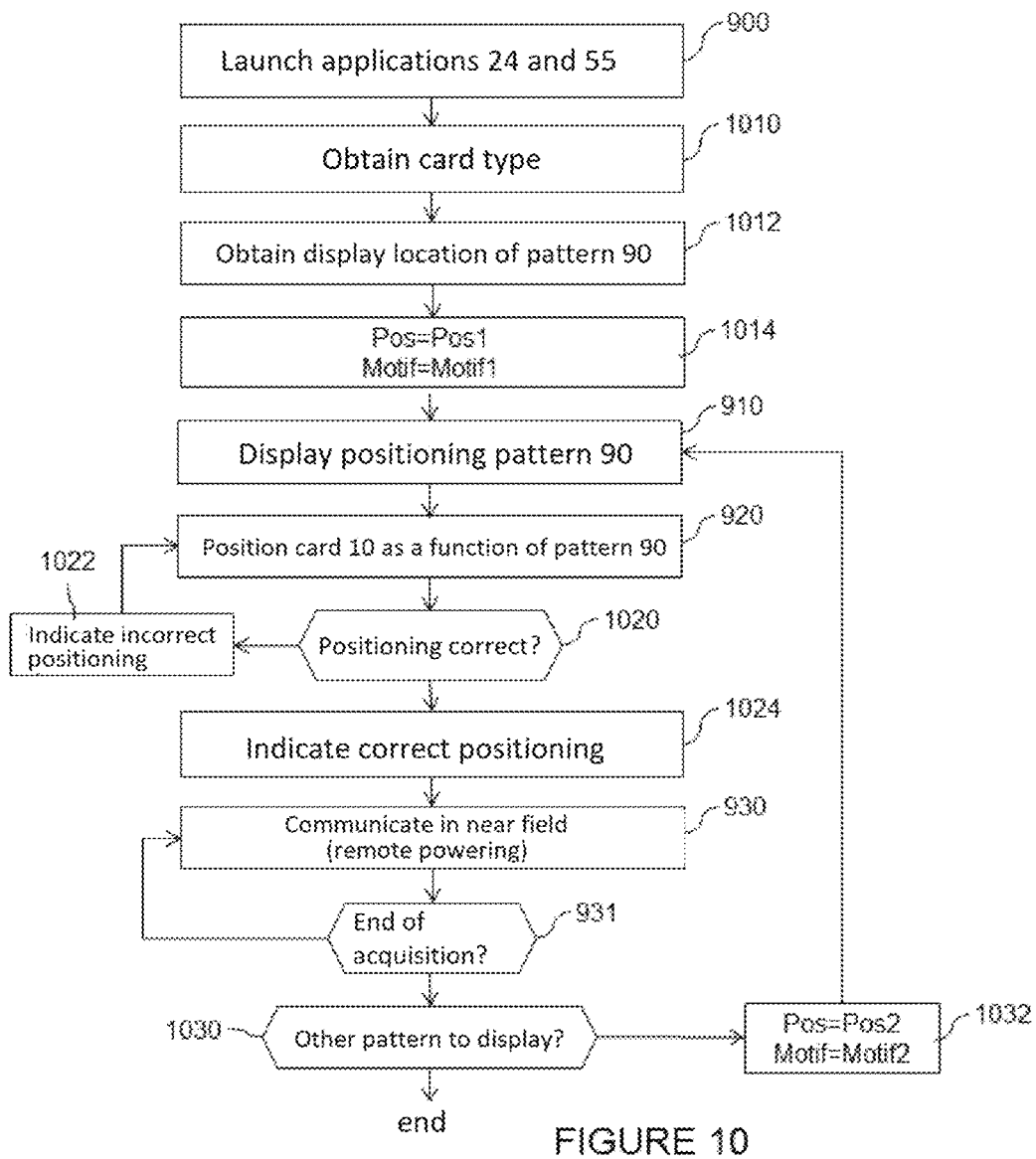
FIG. 10 illustrates, using a flowchart, another embodiment of a method according to the invention.

FIG. 10 illustrates, using a flowchart, another embodiment of a method according to the invention.

This embodiment implements phases which are optional independently from one another.

A first optional phase (steps 1010 to 1014 below) makes it possible to dynamically adjust the positioning pattern 90 and/or its location (including the angle of rotation) of display on the screen 90. This adjustment depends on the type of contactless card 10 and/or the type of smartphone 50.

In this first optional phase, an item of information representative of the contactless card 10 is obtained, for example a type of card (corresponding to a configuration of antenna 28), then a location of display of the pattern 90 is obtained as a function of the information obtained, particularly among several locations associated with several (types of) card. The location also takes into account the type of smartphone 50 (corresponding to a configuration of antenna 58). The display location can be obtained from the server 80 by OTA (Over The Air, taking into account the type of smartphone and/or type of card) or locally by smartphone 50 if the latter contains all the locations associated with the different types of card (for its own type of smartphone).

In a variant, as for the method in FIG. 9, the pattern 90 and its locationof display on the screen 90 can be predefined.

A second optional phase (steps 1030 and 1032 as well as the loop to 910) can apply to the enrolment step requiring the use of both the hands of the user. To facilitate the acquisition of the fingerprints of both hands, it can be timely to use different positions of the card 10 for both hands. Particularly, the card position for the right hand can allow the biometric sensor 40 to be accessible on the right-hand side of the smartphone 50, whereas the card position for the left hand should allow the biometric sensor 40 to be accessible on the left-hand side of the smartphone 50.

Consequently, a second positioning pattern (where applicable identical to the first) can be displayed on the screen for the acquisition of the prints of the other hand. The change from the first positioning pattern (right hand) to the second positioning pattern (left hand) can be automatic or at the command of the user.

Figure 11:
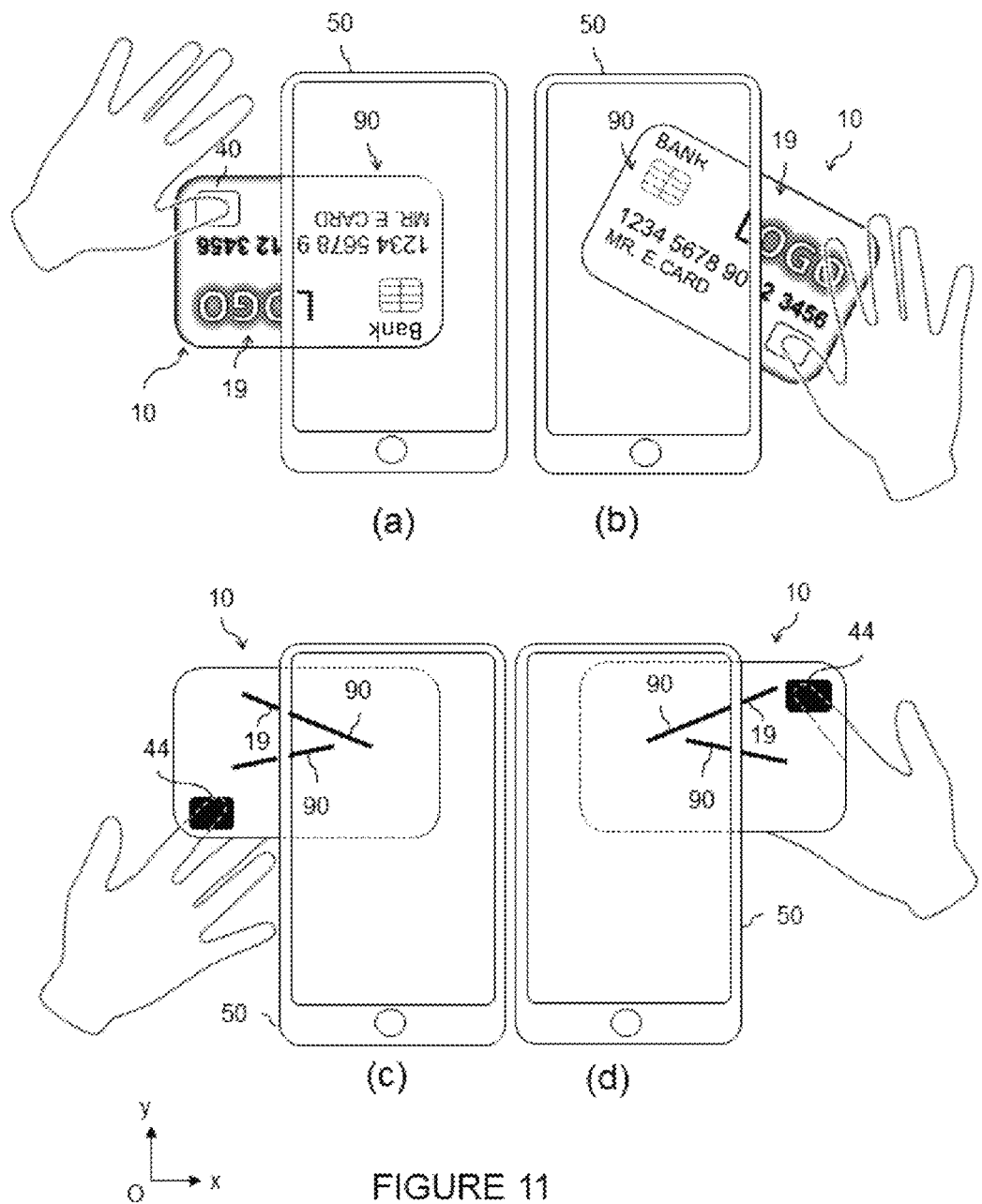
FIG. 11 illustrates an example of an enrolment implementing two different positionings of the same card using the same positioning pattern.

FIG. 11 illustrates an example of enrolment implementing two different positionings of the same card 10 using the same positioning pattern 90 arranged at two different locations on the screen 60 (and differently oriented).

The second optional phase can also apply when it is preferable to turn over the card 10 so that the biometric sensor is in a position opposite the user and directly facing fingers other than the thumb, offering an ease of placement of the fingers for the enrolment of prints, without the need to rotate the wrist.

In this case, two positioning patterns (one for the thumb with the card face upwards—FIG. 5c, and the other for the other fingers with the card turned over see FIG. 5d) are successively displayed.

Taking both hands into account, one may thus have four positioning patterns to be displayed for the acquisition of the fingerprints of all the fingers.

A third optional phase (steps 1020 to 1024 below) improves the aid for positioning of the card 10, in particular when it is brought near under the smartphone 50. This additional aid consists in detecting a positioning of the contactless card with respect to the desired position, then in generating a signal of correct or incorrect positioning as a function of the detection. The user is thus warned of an offset of the card 10 with respect to the ideal position.

It is of course possible to let the user rely solely on the positioning pattern 90 without a signal.

Returning to FIG. 10, in the step 900 already described, the applications 24 and 55, for example of enrolment, are executed.

In the step 1010, an item of information representative of the contactless card 10 or of the card type is obtained.

In an embodiment, the item of information representative of the contactless card 10 is obtained using a camera (not shown) built into the smartphone 50 to acquire a photo of the contactless card. It is preferably a deliberate action of the user in response to an indication displayed on the screen 60 by the application 55 executed. This photo of the visual of the card 10 can be processed locally by the smartphone 50 to deduce a card type therefrom (for example using the card number).

A type of card defines a specific configuration of antenna 28.

According to another embodiment, for example when the application 55 is executed in response to the detection of the card 10 in the NFC field of the smartphone 50, a channel of near field communication between the mobile device and the contactless card can be initiated. During the initialization of this communication, the contactless card 10 can send an initialization message including an indication representative of the card. In particular, the initialization of an NFC communication includes the sending of an ATS message (corresponding to the Answer-To-Reset message for contactless). The step 1010 can thus make provision for the card 10 adding, in the ATS message, an identifier of the card or card type.

In a variant linked to the second type of operation described above, the application 55 of the smartphone can then read an item of information representative of the card type (for example, reference of the card, type of antenna of the card, location of the antenna etc.)

According to yet another embodiment, the user can be associated with a single contactless card 10. In this case, a user identifier or user profile identifier (for example user in the application 55) can suffice to identify the type of card associated.

Once the application 55 has obtained the item of information representative of the card 10, it obtains in step 1012 the location of display of the pattern 90 as a function of this information. It can furthermore obtain an indication of the type of positioning pattern 90 to be used.

In an embodiment, the smartphone 50 asks the server 80 via the network 70 (by OTA for example) for the obtainment of the location (including where applicable a rotation of the positioning pattern 90) and where applicable the nature or type of the pattern 90 to be used.

To do this, the smartphone 50 can send a request to the server 80 containing the item of information representative of the card (e.g. the photo or the card identifier or the user or profile identifier) and an identifier of the type of smartphone.

A pre-processing (for example analysis of the photo) of the item of information representative of the card can be necessary for the server 80 in order to obtain a card type identifier as used in the recordings that it stores.

The server 80 finds, among the recordings corresponding to the type of smartphone indicated, the one corresponding to the type of card in question, then returns to the smartphone the display location indicated in this recording and also, where applicable, the type of pattern 90 to be used indicated in the same recording.

The recording can contain several display locations for one or more positioning patterns. This is the case for example for the two or four card positions necessary for the enrolment described above (right hand/left hand and thumb/other fingers). In this case, the server 80 turns over the locations (for example Pos1 and Pos2) and the patterns (for example Motif1 and Motif2).

In a variant, the smartphone 50 can determine this location or locationsipattem or patterns using recordings that it stores locally.

On reception, the smartphone 50 selects in the step 1014 the first pattern of the first location:
Pos=Pos1
Motif=Motif1

In the step 910 already described, the positioning pattern Motif is displayed on the screen 90 in the location Pos.

In the step 920 already described, the user positions his contactless card 10 as a function of the displayed positioning pattern, by alignment of the card indicator 16, 18 or 19 carried by the card 10 with the pattern.

In the step 1020, the smartphone 50 detects a positioning of the contactless card with respect to the desired position. A margin of error in the positioning of the contactless card with this position, for example 1 cm, can be permitted. In this case there is positive detection.

A first embodiment of this detection can be based on an evaluation, by the card, of the quality of the NFC communication between the card 10 and the smartphone 50. In particular following the display 910, the application 55 can send test signals to the card. The latter returns a "status error" message when it detects too many errors in the received signals. The reception of this message can be an indicator for the application 55 that the card 10 is not yet in the desired position. Conversely, the reception of acknowledgements and the absence of such messages originating from the card 10 can indicate a correct positioning of the latter.

A second embodiment autonomous to the smartphone 50 is based on a measurement of the electromagnetic field (NFC) between the card 10 and the smartphone 50. Such a measure is conventionally used to adjust the clock on which the communication is based as a function of the quality of the communication. The application 55 can compare the measurement of the NFC field to a maximum indicated in the recordings described above (therefore a maximum provided by the server 80 or retrieved locally). Too great a discrepancy between the measurement taken and the indicated maximum signifies an unsatisfactory positioning.

A signal of correct or incorrect positioning can then be generated for the attention of the user as a function of the detection performed in step 1020.

If the positioning of the card 10 is unsatisfactory, a signal of incorrect positioning is transmitted in the step 1022, particularly via the user interface 32. This can be a visual or luminous indication (display on a screen, illumination of a red LED) or a sonic or haptic feedback indication.

In this case, the application 55 remains waiting for a correction of the positioning of the card 10. The application 55 can re-test (step 1020) the positioning of the card periodically, for example every second or half-second. This state of waiting can be limited in time, in order to make it possible to force the transition to the step 930 below (for example a limited number of tests 1020 can be defined).

When the positioning of the card 10 is satisfactory, a correct positioning signal is transmitted in step 1024, particularly via the user interface 32. This can be a visual or luminous indication (display on a screen, illumination of a green LED) or a sonic or haptic feedback indication.

Of course, step 1022 can be omitted: only a correct positioning is notified to the user; or in a variant the step 1024 can be omitted: only an incorrect positioning is notified to the user.

Further to step 1024, the near field communication between the smartphone 50 and the contactless card 10 can be used (step 930 described above) as it is optimal.

For example, the user can acquire the fingerprints of the fingers of his right hand by being guided by the application 55 which informs him of each step of enrolment (where applicable by reading an item of information representative of the enrolment sequencing, entered into the card 10 according to the first type of operation described above). The test 931 makes it possible to determine the end of this acquisition (automatic end after 8×5 acquisitions for example or manual end by the user or reading of a corresponding item of information in the card).

In step 1030, the application 55 checks if there is another location and another pattern 90 to be used. This is the case for example if there is cause to acquire the fingerprints of the fingers of the left hand or to acquire the fingerprints of the thumb after having acquired that of the other fingers of the same hand. The value representing the sequencing of the enrolment read in the card can provide this information.

If not, the method ends.

If yes, the smartphone 50 selects in step 1032 the following pattern and location:
Pos=Pos2
Motif=Motif2

Then the method returns to step 910 to display the new pattern in the new location, typically for the acquisition of the fingerprints of the left hand or the taking of prints with the card turned over in the reverse position. This display then replaces the preceding one.

In the example of FIG. 11, the same positioning pattern 90 is displayed for the thumb of the left hand (FIG. 11*a*) and the thumb of the right hand (FIG. 11*b*) except that it is displayed at different positions with different rotations. The biometric sensor 40 is advantageously found in the card area that extends beyond two opposite lateral sides of the smartphone 50 in the two use positions respectively. On the left-hand figure, the biometric sensor 40 is easily accessible on the left of the smartphone for the left thumb, whereas on the right figure, it is easily accessible on the right of the smartphone for the right thumb. Of course the use case of the thumb is given by way of non-limiting example. All the fingers of the left or right hand can be enrolled for the position of the card under consideration in the description above.

A positioning pattern 90 corresponding to an indicator 19 for which provision is made on the back face of the card 10 is displayed to turn over the card 10 and position it in such a way as to permit the acquisition of the other fingers of the left hand (FIG. 11*c*) and the right hand (FIG. 11*d*). Owing to the marker 44, the user can easily arrange his finger (in dotted lines) under the card 10 facing the biometric sensor 40.

The positions and orientations of the pattern or patterns 90 can differ for the acquisition of the fingerprints of one and the same hand and/or the prints of the fingers of the other hand.

The loop to the step 910 ensures that the second positioning pattern 90 (and subsequently other patterns) is displayed on the screen 60 of the smartphone (step 910), that the user positions the contactless card 10 in the second position where the card indicator (16, 18, 19, 19*t*) is aligned with the second displayed positioning pattern, and a near field communication is thus set up and used between the smartphone 50 and the card 10 in the second first position.

The second positioning pattern 90 can have the same properties as the positioning pattern described above (particularly its complementarity to the card indicator, but also the configurations of FIGS. 4 to 8).

A greater number of positioning of one or more positioning patterns 90 can be envisioned during the same execution of the method.

The preceding examples are only embodiments of the invention which is not limited thereto.

For example, examples above make provision for determining in step 1012 the location of the display of the positioning pattern 90 as a function of the type of card detected 10 and the type of smartphone 50. This approach sometimes requires exchanges with the server 80. To dispense with this restriction, variants can envision making provision for a unique location for displaying the positioning pattern 90 on the screen 60 of the mobile device 50 and make provision for placing the card indicator 19 in the appropriate places of the different envisioned cards 10 such that they are positioned in their respective positions optimizing the near field communication. Consequently, the card indicator 19 is printed in different places for two cards having different antenna 28 configurations.

The invention claimed is:

1. A method for near field communication between a mobile device and a contactless card, the method comprising:
   displaying, on a screen of the mobile device, a positioning pattern;
   positioning the contactless card in a first position, in proximity to the mobile device, such that a card indicator provided on a face of the contactless card is aligned with the displayed positioning pattern, the positioning pattern being visually complementary to the card indicator, the card indicator visually complementing the positioning pattern in the first position to form a predefined pattern, the card indicator being one of (i) printed on the face of the contactless card, (ii) embossed on the face of the contactless card, (iii) an added element on the face of the contactless card, and (iv) a transparent portion of the contactless card; and
   setting up a near field communication between the mobile device and the contactless card in the first position.

2. The method as claimed in claim 1, wherein, in the first position, the contactless card includes an area carrying the card indicator, which extends beyond one side of the mobile device.

3. The method as claimed in claim 2, wherein the displayed positioning pattern includes a first indicator for the positioning of the contactless card along a first axis.

4. The method as claimed in claim 3, wherein the displayed positioning pattern includes a second indicator for the positioning of the contactless card along a second axis not parallel to the first axis.

5. The method as claimed in claim 2, wherein the displayed positioning pattern includes an irregular pattern complementary to the card indicator.

6. The method as claimed in claim 2, further comprising, performed by the mobile device:
   obtaining an item of information representative of the contactless card,
   obtaining a display location depending on the obtained item of information, and
   displaying the positioning pattern on the screen in the obtained display location.

7. The method as claimed in claim 2, wherein the contactless card includes a biometric sensor in a card area which extends beyond one side of the mobile device when the contactless card is in the first position.

8. The method as claimed in claim 1, wherein the displayed positioning pattern includes a first indicator for the positioning of the contactless card along a first axis.

9. The method as claimed in claim 8, wherein the displayed positioning pattern includes a second indicator for the positioning of the contactless card along a second axis not parallel to the first axis.

10. The method as claimed in claim 9, wherein the displayed positioning pattern includes an irregular pattern complementary to the card indicator.

11. The method as claimed in claim 8, wherein the displayed positioning pattern includes an irregular pattern complementary to the card indicator.

12. The method as claimed in claim 8, further comprising, performed by the mobile device:
    obtaining an item of information representative of the contactless card,
    obtaining a display location depending on the obtained item of information, and
    displaying the positioning pattern on the screen in the obtained display location.

13. The method as claimed in claim 1, wherein the displayed positioning pattern includes an irregular pattern complementary to the card indicator.

14. The method as claimed in claim 1, wherein the displayed positioning pattern comprises a partial representation of a visual of the contactless card.

15. The method as claimed in claim 1, further comprising, performed by the mobile device:
    obtaining an item of information representative of the contactless card,
    obtaining a display location depending on the obtained item of information, and
    displaying the positioning pattern on the screen in the obtained display location.

16. The method as claimed in claim 15, wherein the display location further depends on an item of information representative of the type of the mobile device.

17. The method as claimed in claim 15, wherein the positioning pattern to be displayed further depends on the obtained item of information.

18. The method as claimed in claim 1, wherein the contactless card includes a biometric sensor in a card area which extends beyond one side of the mobile device when the contactless card is in the first position.

19. The method as claimed in claim 1, further comprising:
    detecting a positioning of the contactless card with respect to the first position, and
    generating a signal of correct or incorrect positioning as a function of the detection.

20. A mobile device comprising:
    a near field communication interface;
    a screen; and
    a processor configured to display a positioning pattern on the screen, the positioning pattern being displayed at a location of the screen such that a near field communication is set up between the mobile device and a contactless card when the contactless card is positioned in a first position, in proximity to the mobile device, such that a card indicator provided on a face of the contactless card is aligned with the displayed positioning pattern, the positioning pattern being visually complementary to the card indicator, the card indicator visually complementing the positioning pattern in the first position to form a predefined pattern, the card indicator being one of (i) printed on the face of the contactless card, (ii) embossed on the face of the contactless card, (iii) an added element on the face of the contactless card, and (iv) a transparent portion of the contactless card.

\* \* \* \* \*